United States Patent [19]

Buckler

[11] Patent Number: 4,925,203

[45] Date of Patent: May 15, 1990

[54] SEMI-RECUMBENT BICYCLE WITH ADJUSTABLE FRAME

[76] Inventor: Clive E. Buckler, P.O. Box 3732, Chico, Calif. 95927

[21] Appl. No.: 274,769

[22] Filed: Nov. 22, 1988

[51] Int. Cl.$^5$ .................................................. B62K 15/00
[52] U.S. Cl. .................................... 280/278; 280/287; 280/288.1
[58] Field of Search ..................... 280/288.1, 287, 284, 280/278, 282

[56] References Cited

U.S. PATENT DOCUMENTS

| | | | |
|---|---|---|---|
| 626,396 | 6/1899 | Smith | 280/287 |
| 640,680 | 1/1900 | Merrow | 280/287 |
| 709,718 | 9/1902 | Monahan | 280/284 |
| 1,056,492 | 3/1913 | Bilsten | 280/284 |
| 2,482,472 | 9/1949 | Fried | 280/288.1 |
| 4,333,664 | 6/1982 | Turner et al. | 280/261 |
| 4,592,563 | 6/1986 | Dean et al. | 280/288.1 |
| 4,618,169 | 10/1986 | McElfresh | 280/288.1 |
| 4,659,098 | 4/1987 | Jacobson | 280/288.1 |

FOREIGN PATENT DOCUMENTS

| | | | |
|---|---|---|---|
| 0286409 | 2/1965 | Netherlands | 280/288.1 |
| 0006748 | of 1897 | United Kingdom | 280/288.1 |
| 1462154 | 1/1977 | United Kingdom | 280/287 |

Primary Examiner—David M. Mitchell

[57] ABSTRACT

A two wheel semi-recumbent bicycle provided in several embodiments on which the rider sits elevated above the rear wheel on a high-back bucket style seat supported by an angled top tube. The position of the pedal crank assembly is forward and upward of the pedal crank position of conventional bicycles and downward and rearward of that normally associated with fully recumbent bicycles relative to the seat. The rider steers by way of long upwardly curved handlebars affixed to an elongated steering stem originating in a front steering head assembly. The steering stem extends upward and rearward terminating under the area of the rider's upper legs. One version of the semi-recumbent bicycle features a telescoping angled top tube supporting the seat at its upper end to allow both vertical and horizontal adjustment of the rider's position. Other embodiments are provided with removable seat and chain stays replaceable with stay of various lengths to effectively alter both the size and frame geometries of the bicycle. In another variation the seat stays are spring biased shock absorbers and the chain stays are pivotally attached to provide the rider with cushioned ride.

6 Claims, 9 Drawing Sheets

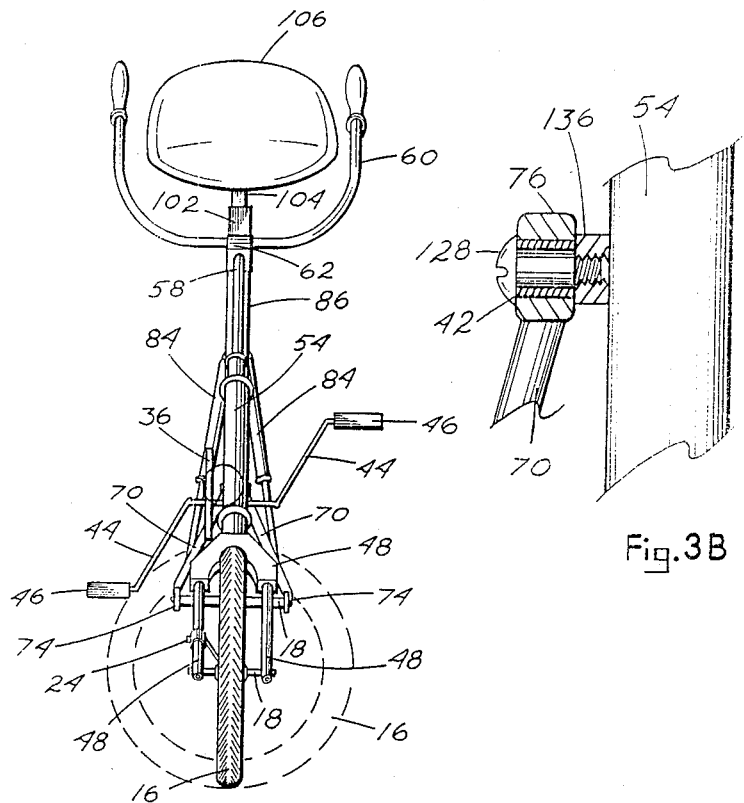
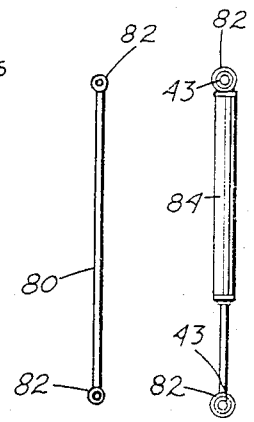
Fig. 3A
Fig. 3B
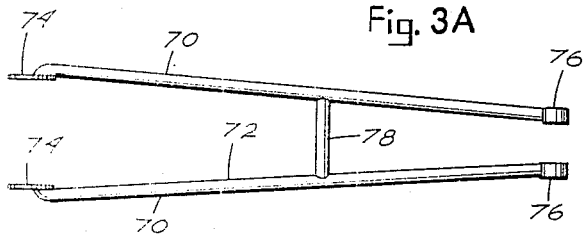
Fig. 4
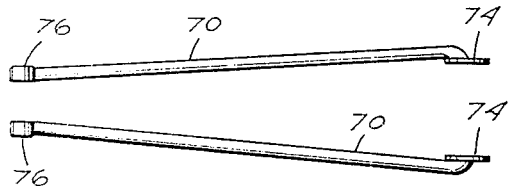
Fig. 5
Fig. 6   Fig. 7

SEMI-RECUMBENT BICYCLE WITH ADJUSTABLE FRAME

BACKGROUND OF THE INVENTION

1. Field of the Invention

This invention relates to bicycles in general. More particularly it relates to a bicycle in which the position of the pedal crank assembly is more forward and upward relative to the seat than that of the pedal crank assembly of conventional bicycles, and somewhat downward and rearward of that associated with fully recumbent bicycles. The rider sits in a semi-recumbent position elevated above the rear wheel and steers by way of handlebars originating under the area of the rider's upper legs.

2. Description of the Prior Art

The frame work of the majority of prior art bicycles is comprised of round tubing welded or brazed together. The permanently welded frames of the prior art bicycles require fabrication of a variety of frame geometries and sizes to achieve different handling characteristics preferred for various uses such as sport, mountain, or tour riding. Also, fixed framing requires a wide variety of frame sizes to accommodate differently sized riders.

An additional problem associated with many past art bicycles is the position of the pedal cranks relative to the seat. This relationship determines the degree of pushing power the rider can develop. Fully recumbent bicycles have solved the pedal to seat relationship problem as far as development of power is concerned, but the vertical height at which the rider sits on these bicycles presents new problems. Sitting quite low in a fully recumbent bicycle makes it difficult for both the rider and automobile drivers to detect the presence of each other over and around other vehicles. Low visibility can lead to accidents.

A further problem with most bicycles is the degree of isolation from road shock the rider is afforded. The rigid frames of the majority of past art bicycles have no provisions truly effective for a shock-absorbing suspension or are they structured in a manner similar to mine. Conventional upright bicycles allow the rider to stand on the pedals and raise off the seat allowing his legs to effectively isolate the heavier mass of the rider from the impact and motion of the lighter mass of the bicycle as bumps are traversed. Standing on the pedals is not possible with semi or fully recumbent bicycles.

An even further problem associated with past art bicycles which use a single vertically adjustable round seat post held by a round post clamp is rotation of the seat post and affixed seat within the clamp. This is especially true of many fully or semi-recumbent bicycles structured in a manner which allow horizontal pushing by the rider. Since the rider pushes with one leg then the other, the seat post with seat can twist sideways causing the rider to loose both power and control.

Although the seats on most conventional prior art bicycles can be raised and lowered to somewhat accommodate differently sized riders, this is only one adjustment needed to allow the bike to fit a wide variety of riders. A few past art bicycles are built with mechanisms giving the seat the ability to be adjusted back and forth horizontally in an attempt to provide the rider with an even greater choice of frame size and geometries. Also, although some of the past art bicycles have seats which will not twist sideways with horizontal pushing pressures, this is accomplished through the use of angled and cross bracing which adds additional weight, bulk, and cost to the bike.

No manually powered bicycles I am aware of are capable of simple and inexpensive changes to both the size and geometries of the frame to accommodate differently sized riders and the frame geometries required for specific types of riding.

I feel my invention not only overcomes the disadvantages presented in the past art devices but provides unique structuring and useful benefits not possessed by any related manually powered bicycle.

SUMMARY OF THE INVENTION

In practice, I have developed a two wheel bicycle provided in several embodiments with interchangeable parts on which the rider sits in a semi-recumbent position elevated above the rear wheel on a bucket style seat. The seat is supported at the upper end of an angled top tube framing member and positions the rider at a height comparable to that of conventional upright diamond-frame bicycles. The position of the pedal crank assembly is forward and upward relative to the seat of the pedal crank position of conventional bicycles, and downward relative to the seat of that normally associated with fully recumbent bicycles.

The rider steers by way of long upwardly curved handlebars on each side of his legs affixed to an elongated steering stem originating in a conventionally structured front steering head assembly. The upper end of the steering stem extends rearward terminating under the area of the rider's upper legs.

One embodiment of my semi-recumbent bicycle features a two-piece telescoping angled top tube supporting the seat. The telescoping angled top tube allows both vertical and horizontal adjustment of the rider's position relative to the pedal crank assembly and the ground. This adjustability results in an optimal leg reach and angle giving the rider a high degree of comfort and pushing power. The angle of the rider's legs being more horizontal than vertical to the pedals, allows for greater pushing power than is associated with conventional stand up bicycles.

Other variations of my semi-recumbent are provided with removable bolt-on rigid seat and chain stays replaceable with stays of various lengths to allow one bicycle to be easily and inexpensively altered for differently sized riders and the desired handling characteristics for different riding situations.

In another variation of the bicycle, the seat stays are replaced by one or two spring biased shock absorbers and the rigid chain stays are pivotally attached at the front of the bicycle to provide the rider with a cushioned ride. The shock absorbers are interchangeable with rigid removable seat stays.

With conventional upright diamond-frame bicycles the rider's weight, not strength, tends to limit the amount of force applied to the pedals. With my bicycle, the rider's legs reach outward in front of the seat with the pushing forces having a substantial horizontal component. With the rider's legs extended forward and not directly downward, the use of a wide comfortable high-backed bucket seat is possible and preferred. The bucket seat with a vertical back gives the rider a surface to push against enabling him develop a high degree of power without pushing himself off the back of the seat.

The positioning of the handlebars and pedals allow the rider to mount the bicycle from the front without having to swing his leg over the high back of the seat. To mount this type of bicycle, the rider straddles the front tire with his back to the bicycle. He reaches back to grip the handlebars, and positions one foot on a horizontally positioned pedal. As he applies pressure to the pedal, the pedal rotates forward and downward driving the rear wheel by way of an interconnecting chain causing the bicycle to start rolling. The rider now raises his body on the downward pedal and positions himself on the seat and begins riding.

Since the rider pushes with one leg then the other, my vertically adjustable seat post is cooperatively structured with a positive anti-rotating clamp to prohibit any side to side turning which might occur with standard round seat posts and typical clamping methods used in many past art bicycles.

The combination of the wide range of adjustability of the seat positioning, the easily replaced seat and chain stays, the ability to use spring suspension, and the positioning of the pedal cranks relative to the raised bucket seat gives my bicycle major advantages over the past art. With my semi-recumbent bicycle having an adjustable frame, parents need only purchase one bicycle for their half-grown child. As the child grows the bicycle framing is easily altered to fit the rider's body. By adjusting the frame size and geometry, the rider is provided with a wide variety of choices in handling characteristics giving him the ability to use the same bike for comfortable long distance touring or the quick turning requirements of off-road riding and sporting events such as bicycle polo and soccer. Also, the vertical height of the rider above the rear wheel allows him to be more easily seen by automobile traffic, and for him to also see better.

Therefore it is a primary object of my invention to provide a bicycle with an adjustable sized frame allowing the rider to use the same bicycle most of his life.

Another object of the invention is to provide a bicycle which can be easily adapted to different required handling characteristics.

A further object of the invention is to provide an effective shock-absorbing system to insulated the rider from road shocks.

A still further object of the invention is to provide a bicycle which gives the rider greater power and speed than is possible with conventional stand up bicycles.

An even further object of the invention is to provide a semi-recumbent bicycle which positions the rider vertically higher than most fully recumbent bicycles.

And yet an even further object of the invention is to provide all the above stated objects cost effectively to the purchaser of such a bicycle.

Other objects and advantages of my invention will be disclosed and understood by a reading the following specification and subsequent comparison with the numbered parts shown in the accompanying drawings.

BRIEF DESCRIPTION OF THE DRAWINGS

FIG. 3A is a frontal view of my semi-recumbent bicycle illustrating the outwardly angled pedal crank arms and small front wheel. FIG. 3B shows in an enlarged view, the forward end of one chain stay attached to the head tube by way of a shouldered bolt into an outward extending threaded boss.

FIG. 4 is a view of two chain stays attached together forming a convenient to change and handle chain stay assembly.

FIG. 5 shows a matched pair of two separate short chain stays.

FIG. 6 shows an unattached rigid seat stay. Mounting apertures are shown at both the top and bottom ends of the stay.

FIG. 7 shows an unattached shock absorber used in some embodiments in place of the rigid seat stays.

DESCRIPTION OF THE PREFERRED EMBODIMENTS

Figure 1:
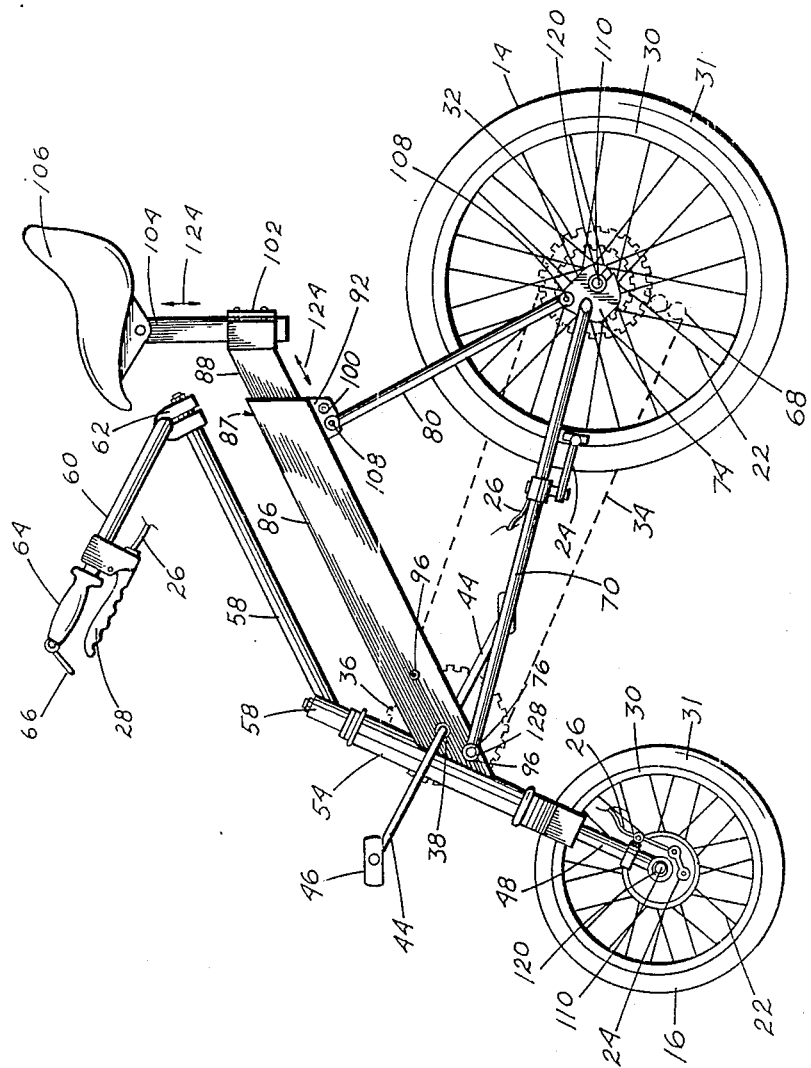
FIG. 1 is a left side view of one embodiment of my semi-recumbent bicycle showing the basic triangular frame structure common to all the various embodiments of the invention. Shown is a large rear wheel, a smaller front wheel, the handlebar structure, the adjustable seat post and clamp supported by the telescoping angled top tube. The seat stays are shown rigid and the chain stays are shown fastened in a lower non-pivotal position.

Referring now to the drawings in general where the various closely related embodiments of my semi-recumbent bicycles are shown. All embodiments use many well known parts in common to each other and to conventional bicycles in wide use today. The front wheel 16 and rear wheel 14 both have wheel rims 30, rubberized tires 31, wheel hubs 18 with internal axles, and spokes 22 typical to standard bicycles. In all versions of my bicycle, multiple gearing may or may not be used. A chain derailleur 68 operable by shifter 66 is used in multiple geared bikes. A standard drive chain 34 is used to link together one or more front sprockets 36 with one or more rear sprockets 32 in order to transfer power from the front pedal assembly to the rear drive wheel 14. The axle in wheel hub 18 of front wheel 16 is removably affixed in fork tips on conventionally formed front forks 48 with nuts 110 and washers 120, or in an equivalent manner such as a standard cam action quick release. The axle of wheel hub 18 of rear wheel 14 is removably affixed in typically formed axle drop-out plates 74 with nuts 110 and washers 120, or in an equivalent manner. All versions of my bicycles are equipped with well known braking systems using caliper or drum brakes 24 operational by brake cables 26 and brake levers 28 or other suitable means. The braking may be applied to either front wheel 16, rear wheel 14 or both.

The conventional well known structuring of the steering assembly located at the front of the bicycle is common in all of my embodiments. The steering assembly is structured with a vertically oriented head tube 54 framing member. Head tube 54 is tilted back at a slight angle in most instances with the lower end more forward than the upper end, however as explained later, as the geometry of the bicycle frames are changeable, head tube 54 will vary in its angle with different frame configurations. Rotatably affixed and bearing supported through the lower end of head tube 54 is the upper end or steering tube of the two spaced parallel front forks 48 attached together at the upper ends adjacent the lower most end of head tube 54. Front forks 48 straddle front wheel 16 and retain it rotatably. At the upper end of head tube 54 is an affixed bearing supported steering stem 58 with handlebars 60. The lower end of steering stem 58 extends downward into head tube 54 and affixes to the upper end of front forks 48 (steering tube). Steering stem 58 is rotatably held within head tube 54. Rotating steering stem 58 by way of side to side movement of handlebars 60 causes front forks 48 to rotate correspondingly for steering the bicycle.

Figure 2:
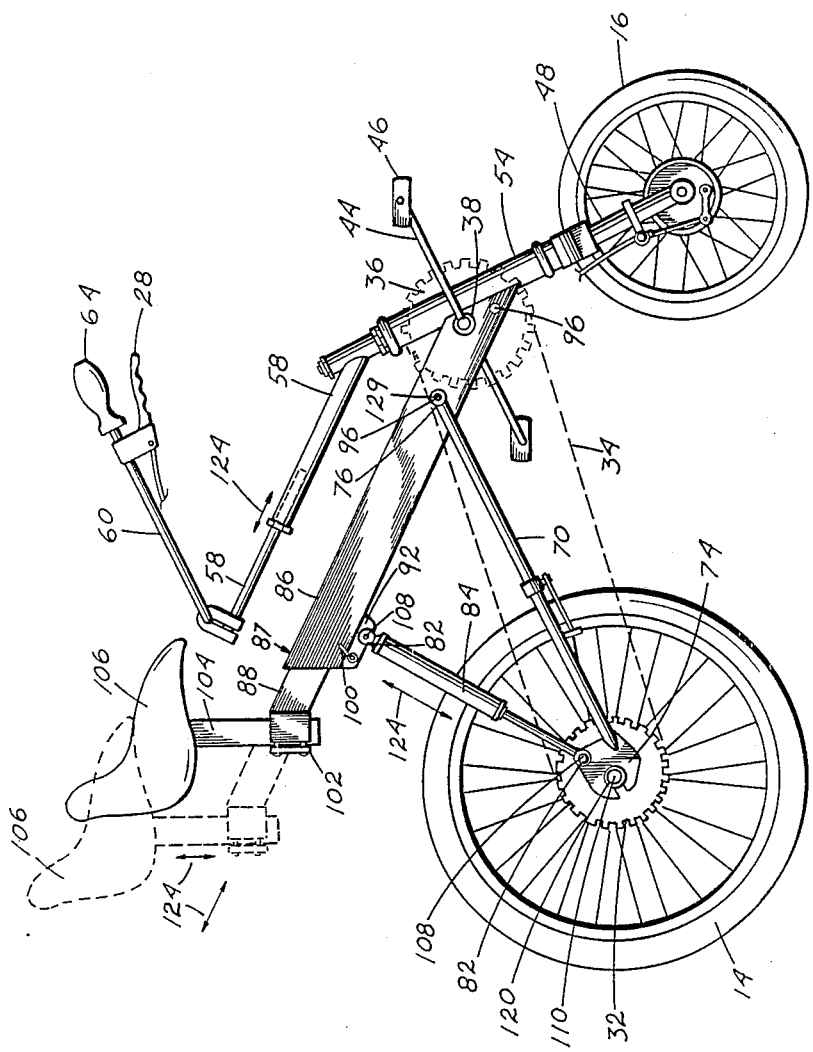
FIG. 2 shows an embodiment using spring biased shock-absorbers in place of the rigid seat stays. The chain stays have been repositioned to a pivotal attachment above the pedal crank assembly in line with the mean chain path to prevent chain pull from activating the suspension. The steering stem is shown as a two-piece telescoping stem.

All embodiments of my semi-recumbent bicycle are structured with steering stem 58 extending from the upper end of head tube 54, angling upward and approximately paralleling angled top tube 86 framing member as shown in FIG. 1. As shown in FIG. 2, steering stem 58 can be a two-piece telescoping stem which gives the rider greater choice in positioning handlebars 60 relative to bucket seat 106 than does the one-piece steering stem 58 shown in FIG. 1.

Figure 14:
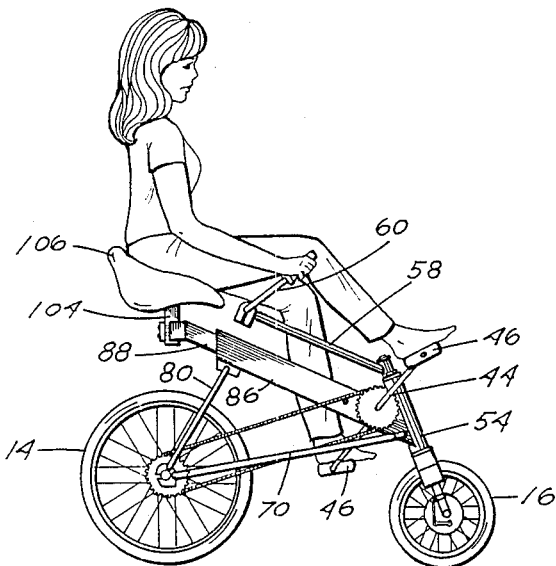
FIG. 14 illustrate how my semi-recumbent bicycle is ridden with the handlebars extending upward from underneath the rider's legs.

Handlebars 60 are long wide-spread U-shaped handles extending upward from where they are attached to steering stem 58 by handlebar clamp 62. Handlebars 60 are equipped with standard handle grips 64 for better gripping. When in use, the lower center section of handlebars 60 is positioned underneath the rider's legs with the upper left and right end sections being wider than and extending upward above the rider's legs, positioned for easy reach as shown in FIG. 3A and 14. The angle of handlebars 60 are adjustable by loosening and tightening handlebar clamp 62.

Figure 20:
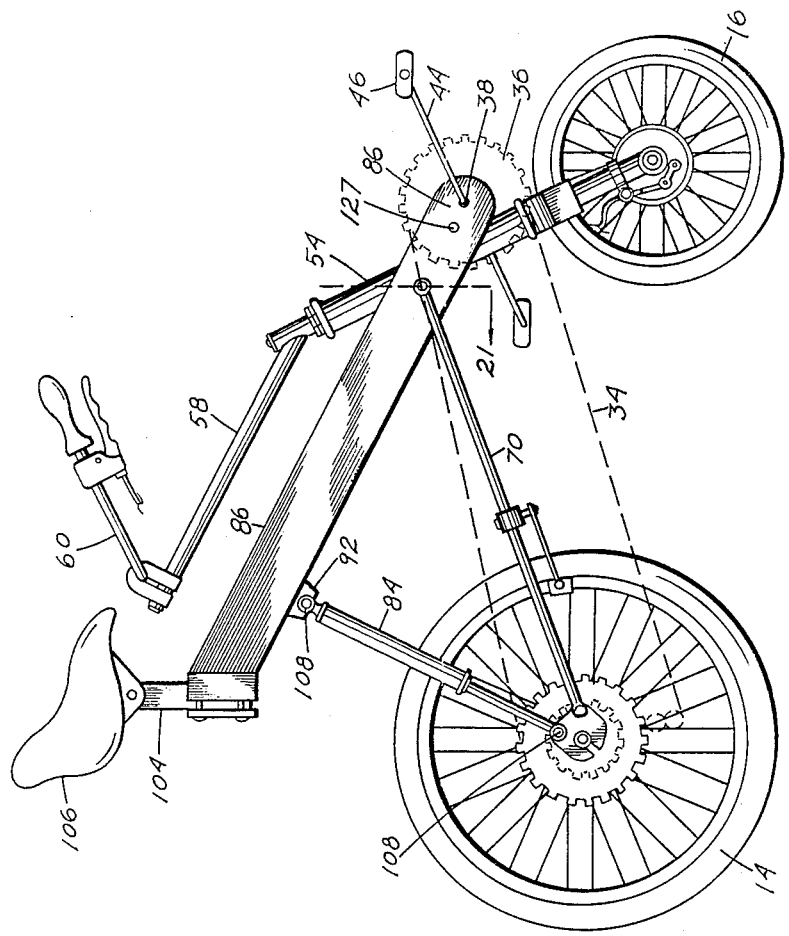
FIG. 20 illustrates a version of my semi-recumbent bicycle which the head tube is affixed through an aperture in the lower end of the angled top tube.

All embodiments of my semi-recumbent bicycles are structured with hollow rectangular, square, or oval angled top tube 86 affixed by welding or other suitable means to head tube 54. Angled top tube 86 extends from the central rearward side of head tube 54, angling upwardly and rearward terminating above rear wheel 14, forward of the rear axle vertical center line. In FIG. 1 and 2 angled top tube 86 is shown welded directly to the rearward side of head tube 54. In FIG. 20, the lower end of angled top tube 86 is shown extending a short distance in front of head tube 54. In the later arrangement, a wide, angled top tube 86 having a vertical aperture through the lower end has been affixed with head tube 54 welded into the aperture to form a very strong structure.

There are two primary versions of angled top tube 86 structures. One being a two-piece angled top tube 87 telescoping assembly, and the second being a one-piece angled top tube 86. The two-piece angled top tube 87 is comprised of angled top tube 86 having a second inner member 88 positioned slidably in an open upper end of angled top tube 86. Angled top tube 86 welded to head tube 54, and inner member 88 are formed of similarly shaped tubing, either square, rectangular, or oval tubing is used to prohibit rotation of inner member 88 in the outer member angled top tube 86. The upper end of inner member 88 extends beyond the upper end of angled top tube 86. At the upper end of inner member 88 is an affixed seat post clamp 102 releasably retaining a vertically oriented and adjustable seat post 104. Seat post 104 supports bucket seat 106 at its upper end. The telescoping two-piece angled top tube 87 is structured to allow inner member 88 to be positioned forward and rearward in angled top tube 86 allowing for both vertical and horizontal adjustments of seat 106 relative to head tube 54, the ground, and the pedals.

Figure 11:
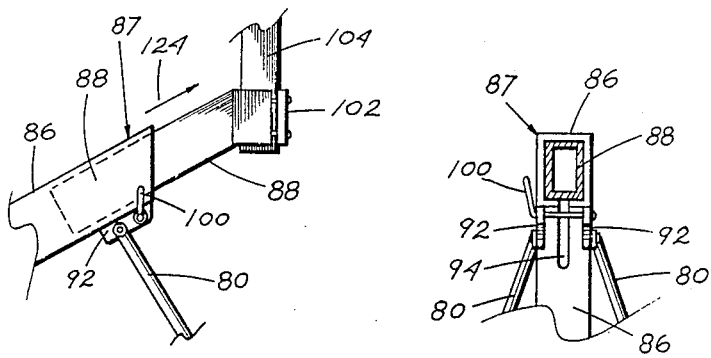
FIG. 11 shows a side view of the upper end of the telescoping angled top tube with attached seat post and clamp. Also shown is the upper end of a rigid seat stay bolted to a flange on the bottom of the angled top tube. Adjacent the attached seat stay is a cam action quick-release tightening lever used to secure the outer section of the angled top tube onto the inner member.
Figure 12:
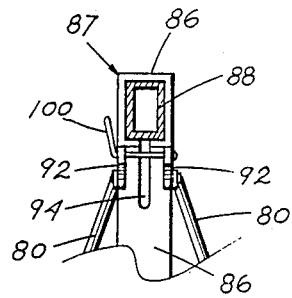
FIG. 12 is an end view from the rear of the upper end of the telescoping angled top tube with the inner member shown cross-sectioned. A short slot is shown in the bottom of the outer tubing to allow the tightening lever to draw the outer sidewalls tightly onto the inner member. The upper ends of both seat stays are shown attached.

In order to secure inner member 88 stationary in angled top tube 86, a releasable clamping means is used comprising angled top tube flanges 92 shown in FIG. 11 and 12 as one possible method. Angled top tube flanges 92 are positioned one on each side of a short slotted channel 94 cut longitudinally through the bottom surface of the upper end of angled top tube 86. Spanning between angled top tube flanges 92 is tightening lever assembly 100. A standard cam action quick release will work fine in this application and will be understood by those skilled in the art. When tightening lever assembly 100 is turned clockwise, the outer vertical walls of angled top tube 86 are drawn tightly onto inner member 88. Slotted channel 94 allows tightening by giving space in the tubing surface of angled top tube 86 to be drawn in. Loosening occurs when tightening lever assembly 100 is rotated counterclockwise allowing the slightly resilient material used in the manufacturing of angled top tube 86 to spring outward. The use of both the telescoping angled top tube 87 and the vertically adjustable seat post 104 allow for a wide range of adjustability of seat 106 relative to pedals 46 and the ground, shown in FIG. 2 and indicated with directional arrows 124.

Figure 19:
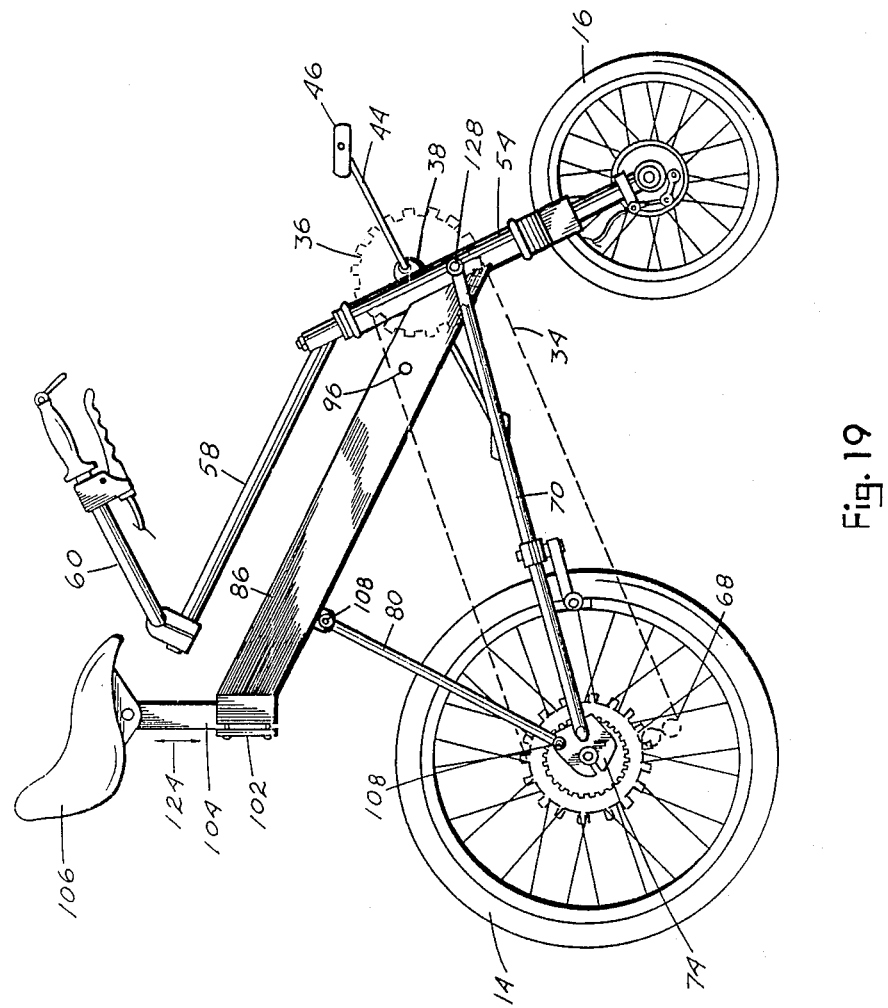
FIG. 19 illustrates one embodiment of my semi-recumbent bicycle using a non-telescoping angle top tube. Also shown is the pedal crank assembly attached to the front of the head tube, and the forward end of the chain stays attached to the side of the head tube.

As shown in FIG. 19, a one-piece angle top tube 86 can be used as an alternative to the two-piece angled top tube 87. This one-piece angled top tube 86 shown in FIG. 19, is used in combination with a vertically adjustable seat post 104 held in seat post clamp 102 which is affixed directly to the upper end of angled top tube 86. The one-piece angled top tube 86 is less preferred for obvious functional reasons, but is less expensive to manufacture and is suitable to some riders.

Figure 8:
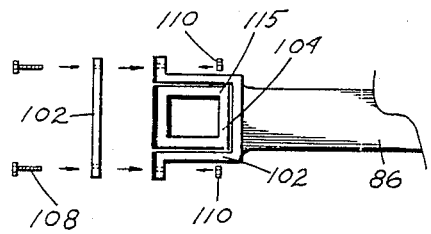
FIG. 8 shows one version of a positive anti-rotation seat post clamp and seat post in a top view with the seat removed. The clamp is shown disassembled.
Figure 9:
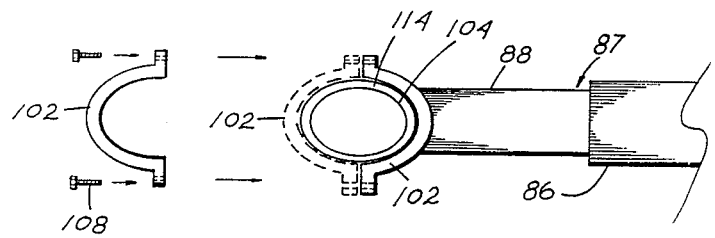
FIG. 9 shows a second version of a positive anti-rotation seat post clamp and seat post in a top view with the seat removed. The clamp is also shown disassembled.
Figure 10:
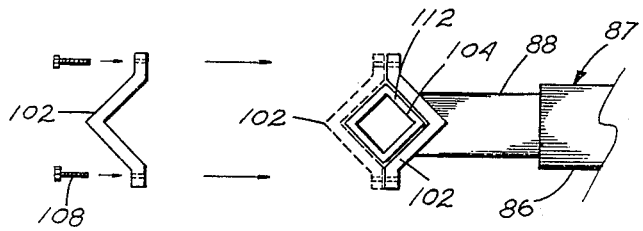
FIG. 10 shows a third version of a positive anti-rotation seat post clamp and seat post in a top view with the seat removed. The clamp is shown disassembled.

In all embodiments of my bicycle, seat post 104 is specifically shaped and releasably adjustably held in a positive anti-rotation position by a correspondingly shaped seat post clamp 102. Seat post clamp 102 and seat post 104 are specifically structured to prohibit side to side twisting which can otherwise occur with the horizontal pedaling pressures associated with semi-recumbent bicycles when round tubing and round clamps are used. In FIG. 8, 9, and 10, three examples of specifically shaped seat post 104 and correspondingly shaped seat post clamps 102 are shown. FIG. 8 is a rectangular tubing 115 seat post 104 with a correspondingly shaped two-piece seat post clamp 102. FIG. 9 shows an oval tubing 114 seat post 104 and seat post clamp 102. FIG. 10 shows a square tubing 112 seat post 104 and seat post clamp 102. Seat post clamps 102 use bolts 108 to tighten the separate outer rearward section of the clamp onto seat post 104. This type of seat post 104 and seat post clamp 102 structuring is very effective and inexpensive to manufacture. It is anticipated other shapes and clamping methods could be designed to achieve the end result, and the three examples shown in FIG. 8, 9, and 10 are three of many geometric configurations which will function as a positive anti-rotation seat post and clamp.

All embodiments of my semi-recumbent bicycle use a conventionally structured rotary pedal crank assembly having crank arms 44 with rotatable pedals 46 and at least one affixed front sprocket 36 supported by a conventionally structured bottom bracket 38. Bottom bracket 38 is a cylindrical tube housing bearings to rotatably support crank arms 44 and will be understood by those skilled in the art. Bottom bracket 38 is affixed to a front framing member, either horizontally through the lower end of angled top tube 86 adjacent head tube 54, as shown in FIG. 1 and 20, or bottom bracket 38 can be mounted by welding or other suitable means directly to head tube 54 as shown in FIG. 19. In either case, pedals 46 are positioned well forward and downward of bucket seat 106. With this pedal positioning relative to seat 106, the rider sits with his legs between handlebars 60, angled forward and somewhat downward with his feet on pedals 46 as shown in FIG. 14. The angle of the rider's legs allow him to push against the back of bucket seat 106 when pedaling, enabling him to develop more power than is possible with conventional or semi-recumbent bicycles which do not use a bucket seat. The forward positioning of bottom bracket 38 on the frame makes it necessary to use a small diameter front wheel 16 in combination with outwardly angled pedal crank arms 44 in order to be able to turn front wheel 16 sharply without interference from pedals 46 as shown in FIG. 3A. A long (wide) crank axle can be used in place of, or in combination with outwardly angled pedal crank arms 44 for pedal and wheel clearance. A larger rear wheel 14 is normally used for both gearing and handling characteristics.

Figure 13:
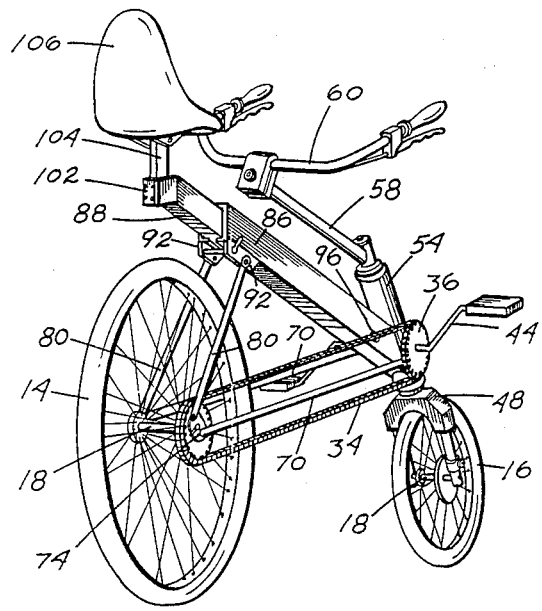
FIG. 13 shows my semi-recumbent bicycle in a perspective view. This embodiment is not using shock absorbers but does have the capability. The high backed bucket seat is also shown.

The upper end of angled top tube 86 must be supported. In one embodiment two vertically oriented rigid seat stays 80 are used. Seat stays 80 are hollow tubing members having a seat stay attachment aperture 82 at each end, as shown in FIG. 6. Each seat stay 80 is removably attached at the upper end, one end to each one of the two parallel angled top tube flanges 92 with a nut 110 and bolt 108 through an unthreaded aperture in each flange 92, or with a bolt 108 into a threaded aperture in each flange 92, or by other suitable means. From the upper attached ends, seat stays 80 extend downwardly and somewhat outwardly on opposite sides of rear wheel 14. The lower end of each seat stay 80 is removably bolted to an axle drop-out plate 74 which rotatably support rear wheel 14 on opposite sides as shown in FIG. 1 and 13.

Each axle drop-out plate 74 is affixed by welding or other suitable means to one rearward end of each of two chain stays 70. Chain stays 70 are substantially straight rigid tubular members each having a bushed attachment aperture 76 at the front or forward end. Each bushed attachment aperture 76 has an internal bushing 42 which will be explained further down in the disclosure. Chain stays 70 can be attached together with a cross member 78, which is also useful as a brake hanger. Two affixed together chain stays 70 form a convenient to replace chain stay assembly 72. From where axle drop-out plates 74 support rear wheel 14 below bucket seat 106, chain stays 70 extend forward straddling rear wheel 14 and angling slightly inward terminating inboard of front sprocket 36. The forward ends of chain stays 70 are removably affixed to a front framing member, either the lower end of angled top tube 86 adjacent head tube 54, or directly to head tube 54.

For attachment of the forward ends of chain stays 70, all of my bicycles are supplied with both an upper and lower attachment location which will be explained further down in the disclosure.

The attachment of the forward ends of chain stays 70 can be accomplished in a variety of methods, with one method being threaded attachment bosses 96 extending completely through the vertical sides of angled top tube 86 as shown in FIG. 1 and 2 where the upper and lower boss 96 is shown. Both the upper and lower threaded attachment bosses 96 are apertures having internal threading on each side of the bicycle to accept a threaded bolt for attaching the forward end of a chain stay 70. Head tube 54 also may be structured as an attachment location for chain stays 70 as shown in FIG. 3A and B and discussed further down in the disclosure.

In use, the bicycle embodiment with rigid seat stays 80 uses chain stays 70 attached at the front ends in a removable non-pivotal manner to a front framing member, either head tube 54 or the lower end of angled top tube 86. The front ends of chain stays 70 are removably non-pivotally attached with short shouldered bolts 128 through each bushed attachment aperture 76 into the lower threaded attachment bosses 96 adjacent head tube 54 as shown in FIG. 1, or directly to head tube 54 as shown in FIG. 19. The external diameter of the shouldered unthreaded area of short shouldered bolts 128 is slightly less than the internal diameter of bushing 42 in each forward end of chain stay 70 to form a close fit between the two surfaces. Bushings 42 are not needed for a non-pivotal attachment, but allow the same chain stays 70 to be pivotally attached as explained further down in the disclosure. Also, the unthreaded shouldered portion of short shouldered bolt 128 is slightly shorter than the width of bushed attachment aperture 76 which allows bolt 128 to be tightened, forcing the sidewalls of bushed attachment aperture 76 tightly against the front framing member. Threaded attachment bosses 96 extending into head tube 54 would interfere with the rotation of the internal portion of the steering assembly. Shown in the enlarged view of the chain stay attachment in FIG. 3A is an outward extending threaded boss 136, one of which is welded on each side of head tube 54 and are used instead of threaded bosses 96 for attachment of chain stays 70 to head tube 54. Short shouldered bolts 128 or long shouldered bolts 129 are used to attach the forward ends of chain stays 70 to the outward extending threaded boss 136 for either pivotal or non-pivotal attachment.

By removably attaching chain stays and seat stays 80, it is very simple and economical for the owner of such a bicycle to replace the seat and chain stays with matched pairs of frame stays of different lengths. By replacing the chain stays 70 and seat stays 80 with different lengths, a rider can easily alter the wheel base length, the position of bucket seat 106 relative to rear wheel 14, and the angle of head tube 54 relative to the ground plane for differently sized riders, and to achieve different handling characteristics desired for various types of riding.

The two removable rigid seat stays 80 shown being used in FIG. 1 are replaceable with two spring biased shock absorbers 84 shown in FIG. 2 and 7. Shock absorbers 84 as shown in FIG. 7 are spring biased through the use of an internal compression coiled spring of the type shown in FIG. 17, or through the use of hydraulics or pneumatics. Each shock absorber 84 is a form of seat stay having a seat stay attachment aperture 82 at each end for removably bolting the shocks 84 in place. In the center of attachment aperture 82 of shock absorbers 84 are apertured rubber bushings 43 which allow a small degree of flexing which is needed as the angle of shocks 84 changes slightly relative to angled top tube 86 during compression and recovery of shock absorbers 84. Also, in order to allow shock absorbers 84 to function properly, each end of the shocks 84 must be bolted in place by pivotal attachment methods such as shouldered bolts. Methods of mounting shock absorbers are well known to those skilled in the art to achieve the proper flexing and pivoting needed, and no further explanation should be required.

Figure 18:
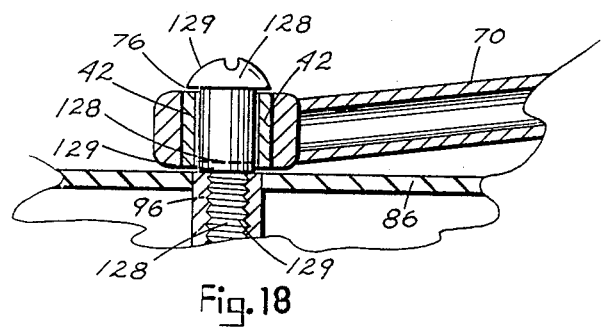
FIG. 18 shows an enlarged sectional view of one mounting method using shouldered bolts to pivotally or non-pivotally attach the forward ends of the chain stays.

When shock absorbers 84 are used, it is preferred to relocate the front mounting position of chain stays 70 from the lower mounting position shown being used in FIG. 1, to the second more upward mounting position shown being in use in FIG. 2. Also, when shock absorbers 84 are used, it is necessary to pivotally mount the forward ends of chain stays 70 to allow shocks 84 to function. The pivotal attachment can be made through the use of several known methods with one being the use of long shouldered bolts 129 through each bushed attachment aperture 76 into threaded bosses 96. The shouldered unthreaded portion of long shouldered bolt 129 used for pivotal mounting is slightly longer than that of the short shouldered bolt 128 used for non-pivotal mounting of chain stays 70. Shown in FIG. 18 is the longer shoulder bolt 129 and the shoulder of the shorter shouldered bolt 128 represented by a dotted line are shown for comparison. Pivotal mounting is accomplished when the shoulder of the tight long shoulder bolt 129 abuts the outer vertical sidewall of the front framing member prior to forcing bushed attachment aperture 76 tightly against the framing member. This leaves chain stays 70 capable of vertical pivoting and changing the angle of chain stays 70 relative to angled top tube 86 when the rider traverses bumps and shock absorbers 84 are compressed. Bushing 42 of bushed attachment aperture 76 rides on the unthreaded surface of the long shouldered bolt 129 providing a low friction bearing surface for smooth pivoting.

Figure 21:
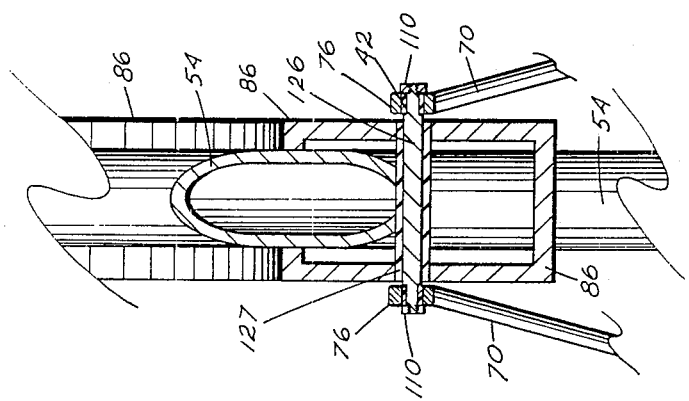
FIG. 21 is a view of the cross-sectioned area of FIG. 20 showing the pivotal attachment method of the chain stays.

As an alternative to threaded bosses, the bicycle shown in FIG. 20 uses a rotatable removably affixed chain stay attachment axle 126 inserted through a bushed chain stay attachment aperture 127 through the lower end of angled top tube 86. FIG. 21 is a view of the sectioned area of FIG. 20 showing a chain stay attachment axle 126 inserted through a bushed chain stay attachment aperture 127. Chain stay attachment axle 126 has threads on both outer most terminal ends. On each end of axle 126 directly inward of the threads is an unthreaded area sized to fit removably yet snugly in bushed attachment aperture 76 of chain stay 70. Directly inward of this unthreaded area is an enlarged major diameter area of the axle with a shoulder between the major and minor unthreaded diameters of the axle. When chain stay attachment axle 126 is inserted in either an upper or lower bushed chain stay attachment aperture 127, the shoulder on each end is slightly outward of the sidewalls of angled top tube 86. Axle 126 is sized to be capable of freely rotating in attachment aperture 127, and to be removable by simply pulling manually. Chain stays 70 are held on the minor diameter of axle 126 pressed firmly against the shoulder by nuts 110. The bicycle shown in FIG. 20 has both an upper and lower bushed chain stay attachment aperture 127. Chain stays 70 are shown attached pivotally mounted in the upper attach position. To mount chain stays 70 in the lower non-pivotal attach position, one would need to remove stays 70, pull axle 126 out and insert it into the lower bushed chain stay attachment aperture 127 and reattach stays 70. In this lower position only rigid seat stays should be used, and will be explained later.

The attachment of the front end of chain stays 70 to the upper attachment location when using shock absorbers 84 above the center of bottom bracket 38 rather than the lower attachment location, angles chain stays 70 at a more upward angle changing the geometry of the frame. The more upwardly angled chain stays 70 as shown in FIG. 2 have been found to reduce the tendency of forceful pedaling to cause angled top tube 86 to be pulled downward causing shock absorbers 84 to compress with each pedal stroke. When angled top tube 86 is pulled downward with pedal torque, it is followed by an upward push from shock absorbers 84 causing the rider to waste a considerable amount of energy and giving him a feeling of instability. The upper chain stay attachment is ideally placed when positioned in the mean path of drive chain 34 as shown in FIG. 2 and 19.

Attachment of the forward ends of chain stays 70 to the upper attachment location when using rigid seat stays 80 puts a higher degree of stress than is applied to the chain stays 70 if attached lower on the front framing member. A high degree of stress can cause breakage in chain stays 70. By reducing stress levels, chain stays 70 can be manufactured of lighter materials. With pivotal attachment of the forward ends of chain stays 70 to the upper attachment location when using shock absorbers 84, very little stress is applied to chain stays 70 and the pedal torque problem is solved. The use of shock absorbers 84 is shown in FIG. 2 where directional arrows 124 indicate the ability of angled top tube 86 to move upward and downward relative to rear wheel 14 to isolate the rider from road shock.

When using two separate chain stays 70 as shown in FIG. 5, pivotally attached to the upper attach location and used with shock absorbers 84 as shown in FIG. 20, it is very important for riding stability of the bicycle to ensure that both chain stays 70 remain in the same plane relative to each other. The use of shoulder bolts for pivotal attachment of a chain stay assembly 72 (see FIG. 4) functions well since cross member 78 ensures chain stays 70 remain in the same plane. Shouldered bolts would not work well for separate pivotally mounted chain stays 70. For separate stays 70, chain stay attachment axle 126 holds the chain stays 70 in the same plane with bushed attachment aperture 76 held stationary on the shouldered axle 126. However, it is obvious chain stay assembly 72 has advantages over two separate chains stay 70 and thus is the preferred arrangement.

Figure 15:
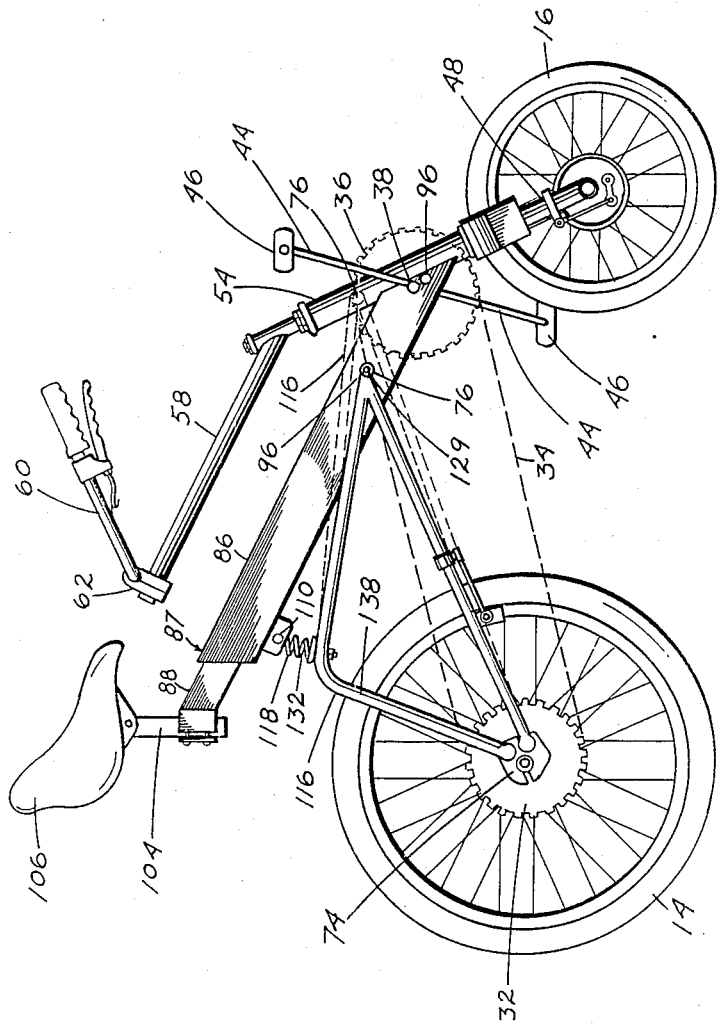
FIG. 15 shows in a right side view, an embodiment of my semi-recumbent bicycle which uses a one-piece triangular framework which is shown pivotally mounted to the forward lower end of the angled top tube. Represented by a dotted line is the one-piece triangular frame attached to the head tube demonstrating an alternative attachment location. The upper end of the angled top tube is shown supported by a compression spring biasing means attached to the apex of the one-piece triangular frame.
Figure 16:
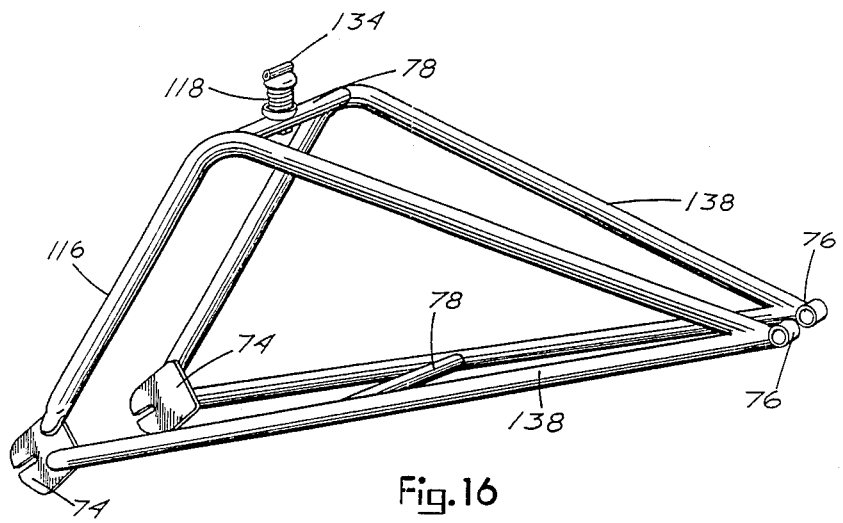
FIG. 16 illustrates the one-piece triangular frame of bicycle shown in FIG. 15.

One embodiment of my semi-recumbent bicycle shown in FIG. 15 uses a one-piece triangular frame 116 and a spring biasing means affixed between angled top tube 86 to provide the rider with a shock absorbing suspension. Triangular frame 116 shown in FIG. 16 is comprised two vertically oriented triangular framing members 138. The two identical triangular framing members 138 are permanently affixed together by a horizontally positioned lower cross member 78, and upwardly by a horizontally positioned upper cross member 78 at the apex of the frame. Triangular frame 116 is spaced apart at the front end to allow straddling of a front framing member, and spaced wider at the rear end to allow straddling of rear wheel 14 as shown in FIG. 16. Also shown in FIG. 16 at the rear of each triangular framing member 138 are axle drop-out plates 74 attached by welding or other suitable means. Axle drop-out plates 74 rotatably support rear wheel 14 on each side. From where triangular framing members 138 straddle and support rear wheel 14, each framing member 138 extends forward toward the front end. The front end of each triangular framing member 138 has one bushed attachment aperture 76 as shown in FIG. 16.

Figure 17:
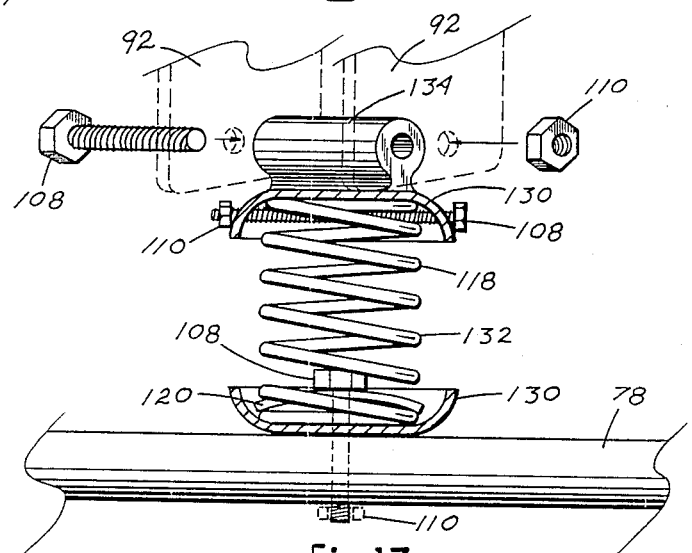
FIG. 17 illustrates in detail one method of spring biasing the triangular framing of the bicycle shown in FIG. 15. The spring is shown mounted on an upper cross member of the triangular frame. Also shown is one possible structure for mounting the upper end of the spring to the attachment flanges on the underside of the angled top tube.

In use, the front end of triangular frame 116 is pivotally bolted to the upper attachment location on a front framing member. Again, the front framing member can be either the lower end of angled top tube 86 or head tube 54 as shown in FIG. 15 where a dotted line represents the attachment of frame 116 to head tube 54. Rear wheel 14 is mounted in axle drop-out plates 74. Angle top tube 86 is affixed to the apex of triangular frame 116 by way of spring assembly 118. Spring assembly 118 shown in FIG. 17 is comprised of an upper and lower cupped spring retainer 130, and a compression spring 132 between the two cupped spring retainers 130. The lower end of spring assembly 118 is attached to the upper cross member 78 by way of a horizontally positioned washer 120 spanning the lower section of spring 132 which sits in the upward cupped side of the lower cupped spring retainer 130. A vertically oriented bolt passes downward through washer 120, through an aperture in the center of lower cupped spring retainer 130, through the upper cross member 78 and is secured with a nut. At the upper end of spring assembly 118, cupped spring retainer 130 is attached to compression spring 132 by a bolt positioned horizontally through spring 132 and two aligned apertures in the side walls of cupped spring retainer 130 where it is secured by a nut. The upper side of the upper cupped spring retainer 130 is affixed with a horizontally positioned spring assembly attachment tube 134 having a longitudinal aperture centrally. Spring assembly attachment tube 134 is slightly shorter in length than the space between angled top tube flanges 92. Spring assembly attachment tube 134 is positioned between both angled top tube flanges 92 and secured in place with a bolt 108 through the central aperture in spring assembly attachment tube 134, through each of two aligned unthreaded aperture in flanges 92 where it is secured with a nut 110 as shown in FIG. 17. The length of spring assembly attachment tube 134 allows it and its mounting system to eliminate the need for tightening lever assembly 100 used to tighten angled top tube 86 onto inner member 88. When the bolt used to mount spring assembly attachment tube 134 to flanges 92 is tight, angled top tube 86 of the two-piece angled top tube 87 is tight on inner member 88. This is just one example of the several ways a spring biasing device can be attached between the one-piece triangled frame 116 and angled top tube 86, and no inventive claim is made to this simple attachment method. Compression spring 132 is also just one example of spring biasing which can be used. The compression spring 132 could also be either a short hydraulic or pneumatic shock absorber of the type shown in FIG. 7.

In all embodiments of my semi-recumbent bicycle, head tube 54, angled top tube 86, seat post 104, and front and rear wheels 16 and 14 are aligned along a longitudinal axis. Also, although the wheel base length is adjustable through the use of changeable seat and chain stays, the distance between the center of rear wheel 14 and front wheel 16 normally ranges from about 26 inches to about 38 inches. The materials used to manufacture the framing members of my semi-recumbent bicycle are metals and metal alloys similar to those currently being used in other bicycles. However, with the advances being made in plastic technologies it is anticipated that many or all of the framing members could be manufactured of suitably strong plastic and plastic metal combinations. All embodiments are manufactured and sold with both an upper and lower chain stay 70 attachment location. Chain stay attachment axles 126, outward extending threaded bosses 136 or threaded attachment bosses 96 are used either together or in combination for attaching the forward ends of chain stays 70. My bicycle sold with both an upper and lower chain stay attach location give the user of such a bicycle a wide choice of possible arrangements of his bicycle framing which he can easily change with just a hand held wrench and a few relatively inexpensive parts.

Although I have described the various embodiments of my invention in considerable detail, it is to be understood that some of the detail described is well know to those skilled in the art and was given for example only, and that modifications may be made to both the inventive and non-inventive embodiments of the invention within the intended scope of the appended claims.

The embodiments of the invention in which an exclusive property or privilege is claimed are defined as follows:

1. A bicycle on which a rider sits in a semi-recumbent position, said bicycle having an adjustable frame adapted to accommodate differing sizes of a said rider and to provide various handling characteristics for differing riding surfaces and riding requirements, comprising;

a generally vertically oriented head tube frame member, a downward end of said head tube having wheel attachment means rotatably affixed thereto, said wheel attachment means retaining a rotatably affixed front wheel, said head tube having a rotatably affixed steering stem extending from an upper end thereof, said steering stem having an attached handlebar at an upper end thereof adapted for manual gripping by said rider, said steering stem adapted to rotate said wheel attachment means with rotation of said handlebar by said rider, said rotation of said wheel attachment means with said attached front wheel adapted to provide steering of said bicycle;

a top tube comprised of an inner member telescopically positioned within an outer member adapted to provide length adjustability of said top tube, said top tube affixed at a downward end thereof to a rearward side of said head tube, said top tube extending angled upward and rearward from said head tube;

a releasable clamping means adapted to secure said inner member stationary relative to said outer member of said top tube;

a generally vertically oriented seat post affixed by a seat post clamp to an upper rearward terminal end of said top tube with said seat post clamp adapted to provide vertical adjustability of said seat post;

a seat affixed to an upper end of said seat post;

said head tube and said attached top tube being a main framework of said bicycle;

said head tube and said top tube at said downward end adjacent said head tube being a front end of said main framework;

a rear wheel support framework affixed to said main framework at a first and a second attachment, said first attachment being a forward end of said rear wheel support framework attached to said front end of said main framework, said second attachment being an upper rearward end of said rear wheel support framework attached to a rearward stationary end of said top tube;

a rear wheel rotatably affixed to said rear wheel support framework, said rear wheel positioned generally below said seat and aligned along a longitudinal axis with said front wheel;

said rear wheel having at least one sprocket attached thereto;

a manual powering assembly adapted to allow powering of said bicycle by said rider's legs with said rider sitting on said seat in said semi-recumbent position, said powering assembly comprised of a bottom bracket affixed to said front end of said main framework, said bottom bracket adapted to support two oppositely disposed rotatable crank arms, each said crank arm having a rotatably affixed foot pedal attached thereto, one said crank arm having at least one affixed front sprocket, said front sprocket connected by a drive chain to said rear sprocket adapted to rotate said rear wheel with rotation of said crank arms;

said rear wheel and said front wheel adapted to contact said riding surface allowing said bicycle to be propelled with said rider sitting on said seat applying power to said pedals of said manual powering assembly.

2. The bicycle as described in claim 1 wherein said inner member and said outer member of said top tube are generally rectangular in shape adapted to prohibit axial rotation of said inner member in said outer member.

3. The bicycle as described in claim 1 wherein said rear wheel support framework is attached to said main framework by removable attachment means adapted to allow removal and attachment of a differently sized said rear wheel support framework to said main framework.

4. The bicycle as described in claim 1 with said rear wheel support framework affixed to said main framework at a first and second attachment wherein said first attachment is a pivotal attachment and said second attachment is a spring biased attachment with said attachments providing shock absorption between said seat and said rear wheel.

5. The bicycle as described in claim 1 wherein said seat is a high-backed bucket style seat.

6. The bicycle as described in claim 1 wherein said steering stem extends upward and rearward from said head tube in substantially parallel alignment with said top tube, said steering stem terminating adjacent said seat with said attached handlebars positioned for placement generally under said rider's legs.

* * * * *